(12) United States Patent
Lee et al.

(10) Patent No.: US 8,090,390 B2
(45) Date of Patent: Jan. 3, 2012

(54) METHOD OF TRANSMITTING AND RECEIVING PAGING MESSAGES IN WIRELSS COMMUNICATION SYSTEM

(75) Inventors: Young Dae Lee, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/312,226

(22) PCT Filed: Nov. 1, 2007

(86) PCT No.: PCT/KR2007/005499
§ 371 (c)(1),
(2), (4) Date: Apr. 30, 2009

(87) PCT Pub. No.: WO2008/054159
PCT Pub. Date: May 8, 2008

(65) Prior Publication Data
US 2009/0318170 A1 Dec. 24, 2009

Related U.S. Application Data

(60) Provisional application No. 60/863,957, filed on Nov. 1, 2006, provisional application No. 60/864,132, filed on Nov. 2, 2006.

(30) Foreign Application Priority Data

Nov. 1, 2007 (KR) .......................... 10-2007-0110789

(51) Int. Cl.
*H04W 68/00* (2009.01)

(52) U.S. Cl. ........................................ 455/458; 370/328
(58) Field of Classification Search .................. 455/464, 455/458, 434, 550.1; 370/328, 329
See application file for complete search history.

(56) References Cited

U.S. PATENT DOCUMENTS

| | | | |
|---|---|---|---|
| 7,089,029 B2 | 8/2006 | Cao et al. | |
| 2002/0019241 A1* | 2/2002 | Vialen et al. | 455/458 |
| 2002/0094833 A1 | 7/2002 | Lieshout et al. | |
| 2002/0115460 A1 | 8/2002 | Rune et al. | |
| 2004/0106430 A1* | 6/2004 | Schwarz et al. | 455/552.1 |
| 2004/0152473 A1 | 8/2004 | Kuwano et al. | |
| 2005/0009527 A1* | 1/2005 | Sharma | 455/445 |
| 2005/0020260 A1* | 1/2005 | Jeong et al. | 455/434 |
| 2005/0153714 A1 | 7/2005 | Subrahmanya | |
| 2005/0201319 A1* | 9/2005 | Lee et al. | 370/321 |
| 2005/0266846 A1* | 12/2005 | Kim | 455/436 |
| 2006/0094478 A1* | 5/2006 | Kim et al. | 455/574 |
| 2006/0221910 A1 | 10/2006 | Narasimha et al. | |
| 2008/0089285 A1* | 4/2008 | Pirskanen et al. | 370/329 |

(Continued)

FOREIGN PATENT DOCUMENTS

EP  1 071 304  1/2001

(Continued)

*Primary Examiner* — Kamran Afshar
*Assistant Examiner* — Joseph Dean, Jr.
(74) *Attorney, Agent, or Firm* — McKenna Long & Aldridge LLP (57) ABSTRACT

A method of transmitting and receiving paging messages in a wireless communication system is disclosed. The method of transmitting paging messages in a wireless communication system comprises transmitting paging messages to a plurality of user equipments from a network of the wireless communication system, wherein the network transmits the paging messages to different user equipments, which are in different connection states, through different channels.

20 Claims, 10 Drawing Sheets

U.S. PATENT DOCUMENTS

| | | |
|---|---|---|
| 2008/0274754 A1 | 11/2008 | Kuo |
| 2009/0318170 A1* | 12/2009 | Lee et al. .................... 455/458 |

FOREIGN PATENT DOCUMENTS

| | | |
|---|---|---|
| EP | 1 221 821 | 7/2002 |
| EP | 1 223 775 | 7/2002 |
| GB | 2 371 179 | 7/2002 |
| GB | 2 409 603 | 6/2005 |
| JP | 2002-501706 A | 1/2002 |
| JP | 2005-512474 A | 4/2005 |
| JP | 2008-518548 A | 5/2008 |
| KR | 10-2001-0110537 | 12/2001 |
| KR | 10-2002-0027247 | 4/2002 |
| KR | 10-2002-0039121 | 5/2002 |
| KR | 10-2003-0029310 | 4/2003 |
| KR | 10-2005-0028254 | 3/2005 |
| WO | WO 98/54919 A2 | 12/1998 |
| WO | WO 03/051077 A1 | 6/2003 |
| WO | WO 2005/079085 | 8/2005 |
| WO | WO 2006/049441 A1 | 5/2006 |
| WO | WO 2007/148932 | 12/2007 |

* cited by examiner

METHOD OF TRANSMITTING AND RECEIVING PAGING MESSAGES IN WIRELSS COMMUNICATION SYSTEM

This application is a national stage entry of International Application No. PCT/KR2007/005499, filed Nov. 1, 2007, and claims the benefit of U.S. Application No. 60/863,957, filed Nov. 1, 2006, U.S. Application No. 60/864,132, filed Nov. 2, 2006, and Korean Application No. 10-2007-0110789, filed on Nov. 1, 2007, each of which are hereby incorporated by reference in their entireties for all purposes as if fully set forth herein.

TECHNICAL FIELD

The present invention relates to a wireless communication system, and more particularly, to a method of transmitting and receiving paging messages in a wireless communication system.

BACKGROUND ART

In a wireless communication system, a paging procedure is used to call a specific user equipment or a plurality of user equipments. Two kinds of paging messages, i.e., Paging Type 1 and Paging Type 2 are used in a universal mobile telecommunication system (UMTS).

The Paging Type 1 message is used to call a user equipment which is in an idle mode and a connected mode of CELL-PCH and URA_PCH. A core network can call a user equipment which is in an idle mode to set up signaling access to the user equipment or to request the user equipment of setup of call or session. Furthermore, the core network can call a user equipment which is in a state of CELL-PCH or URA_PCH so that the user equipment performs a cell update procedure or a URA (UTRAN Registration Area) update procedure. Also, UTRAN can use the Paging Type 1 message to command the user equipment to read updated system information. Since the updated system information is important for all user equipments within a cell, all user equipments within a cell can be called. To identify a user equipment which is to be called, a paging message includes identification information of a user equipment. If a user equipment is in an idle mode, the paging message includes identification information of an upper level, such as International Mobile Subscriber Identity (IMSI), Temporary Mobile Subscriber Identity (TMSI), and Packet Temporary Mobile Subscriber Identity (P-TMSI). If a user equipment is in a connected mode, the paging message includes UTRAN radio network temporary identity (U-RNTI).

The Paging Type 2 message is used in case where the user equipment is in a connected mode of Cell_DCH or Cell FACH state. Also, the Paging Type 2 message is used to additionally call the user equipment through RRC connection which is previously set. Since the RRC connection is used for the Paging Type 2 message, a dedicated call of a specific user equipment can be implemented.

A user equipment which is in an idle mode and a connected mode of CELL_PCH and URA_PCH state in the UMTS supports a discontinuous reception (DRX) mode to reduce power consumption. The discontinuous reception mode means that a user equipment does not always monitor a specific channel to receive downlink data transmitted from a network but is in a sleep mode for most of the time and wakes up for a specific interval to identify the presence of data received from the network. When there is a call from the user equipment, the UTRAN transmits paging indication (PI) to the user equipment through a paging indication channel (PICH) to indicate that a paging message will be transmitted after a certain time period. The user equipment which has received PI receives the paging message after a certain time period.

As described above, in a universal mobile telecommunication system (UMTS), a user equipment which is in a connected mode of CELL-PCH or URA-PCH as well as a user equipment which is in an idle mode is operated in accordance with the DTX mode. However, in the related art, since a network calls a user equipment which is in an idle mode and a user equipment which is in a connected mode of CELL-_PCH or URA_PCH by using the same paging channel, problems occur in that the paging channel is not suitable for features of the user equipments which are in respective states and radio resources cannot be used efficiently.

DISCLOSURE OF THE INVENTION

Accordingly, the present invention is directed to a method of transmitting and receiving paging messages in a wireless communication system, which substantially obviates one or more problems due to limitations and disadvantages of the related art.

An object of the present invention is to provide a method of transmitting and receiving paging messages in a wireless communication system, in which paging messages are transmitted in accordance with features of operation states of different user equipments.

Another object of the present invention is to provide a method of transmitting and receiving paging messages in a wireless communication system, in which radio resources are efficiently used.

To achieve these objects and other advantages and in accordance with the purpose of the invention, as embodied and broadly described herein, a method of transmitting paging messages at a user equipment in a wireless communication system comprises transmitting paging messages to a plurality of user equipments from a network of the wireless communication system, wherein the network transmits the paging messages to different user equipments, which are in different connection states and operated in accordance with DRX mode, through different channels. In other words, the network transmits a paging message to a first user equipment which is in a first connection state, through a first channel depending on a connection state with the network, and transmits a paging message to a second user equipment which is in a second connection state, through a second channel. In this case, the connection state defines an operation mode and a communication state of the user equipment, and can be divided into an idle mode and a connected mode. This is related to whether connection for data communication between specific protocol layers of the network and the user equipment is set up. The idle mode corresponds to a case where connection between the protocol layers is not established, and the connected mode corresponds to a case where connection between the protocol layers is established.

In another aspect of the present invention, a method of receiving a paging message at a user equipment in a wireless communication system comprises receiving a paging message from a network through a first channel in a first state in which a connection between specific protocol layers of the network and the user equipment is established, and receiving a paging message from the network through a second channel in a second state in which a connection between the specific protocol layers is not established. In other words, the user equipment which is in a connected mode receives the paging message from the network through a channel on which the paging message and messages other than the paging message are transmitted, and the user equipment which is in an idle mode receives the paging message from the network through a channel dedicated for paging. Preferably, the first state is a CELL_PCH or URA_PCH state, and the second state is an idle mode state.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described hereinafter are examples in which technical features of the present invention are applied to High Speed Downlink Packet Access (HSDPA) technology of Universal Mobile Telecommunications System (UMTS). Release 7 of 3GPP technical specifications ($3^{rd}$ Generation Partnership Project; Technical Specification Group Radio Access Network) can be referred to obtain detailed information of technical specification about the UMTS.

Figure 1:
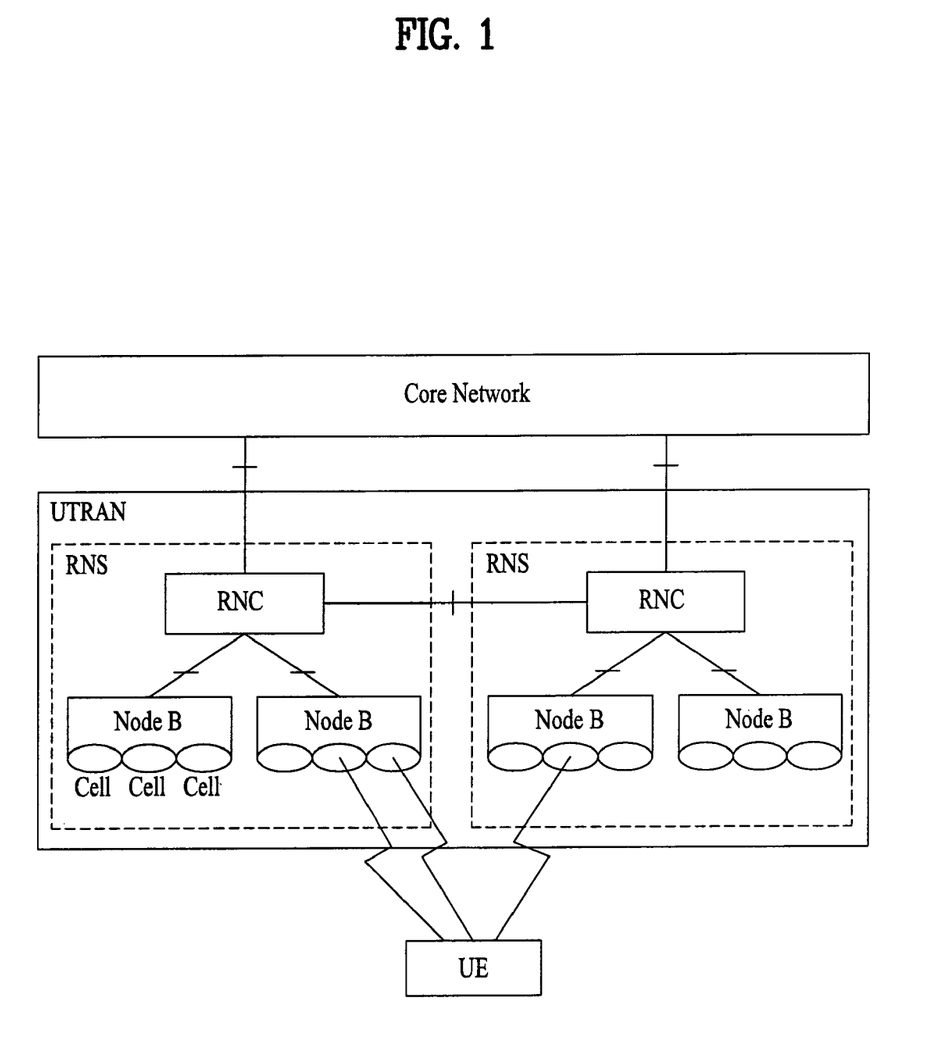
FIG. 1 illustrates a network architecture of a UMTS (Universal Mobile Telecommunications System)

FIG. 1 illustrates a network architecture of UMTS. Referring to FIG. 1, the UMTS includes a user equipment (UE), UMTS terrestrial radio access network (UTRAN), and a core network (CN). The UTRAN includes one or more radio network subsystems (RNS), wherein each of the RNS includes a radio network controller (RNC) and one or more base stations (Node B) managed by the RNC. One or more cells exist in one Node B.

Figure 2:
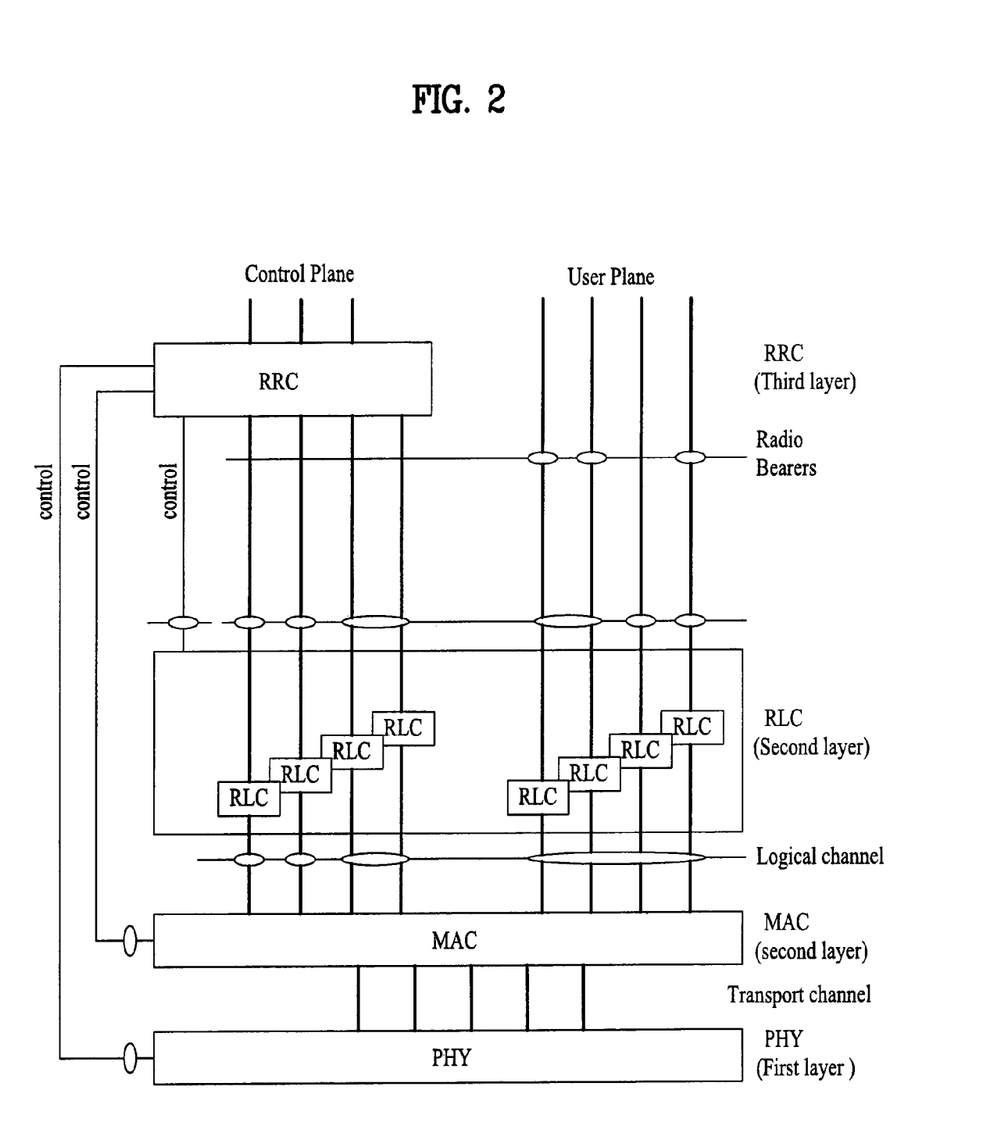
FIG. 2 illustrates a radio protocol architecture which is used in UMTS.

FIG. 2 illustrates a radio protocol architecture which is used in UMTS. Radio protocol layers shown in FIG. 2 exist in the UTRAN in pairs with user equipments and are in charge of data transmission in a radio interval. Each of the radio protocol layers will be described below. First of all, a physical (PHY) layer belonging to a first layer serves to transmit data to a radio interval by using various radio transmission techniques. The PHY layer is connected with a medium access control (MAC) layer, which is an upper layer of the PHY layer, through a transport channel. The transport channel is divided into a dedicated transport channel and a common transport channel depending on whether to share channels.

A medium access control (MAC) layer, a radio link control (RLC) layer, a packet data convergence protocol (PDCP) layer, and a broadcast/multicast control (BMC) layer exist in a second layer. The MAC layer serves to map various logical channels with various transport channels and to multiplex several logical channels with one transport channel. The MAC layer is connected with the RLC layer, which is an upper layer of the MAC layer, through a logical channel. The logical channel is divided into a control channel and a traffic channel depending on kinds of information which is transmitted, wherein the control channel transmits information of a control plane and the traffic channel transmits information of a user plane.

The MAC layer is subdivided into a MAC-b sublayer, a MAC-d sublayer, a MAC-c/sh sublayer, a MAC-hs sublayer, and a MAC-e sublayer depending on kinds of a transport channel. The MAC-b sublayer manages a broadcast channel (BCH), the MAC-c/sh sublayer manages a common transport channel such as a forward access channel (FACH) or a downlink shared channel (DSCH), and the MAC-d sublayer manages a dedicated channel. The broadcast channel (BCH) is a transport channel which is in charge of broadcasting of system information, the common transport channel is shared with other user equipments, and the dedicated channel is a transport channel for only a specific user equipment. Also, to support downlink and uplink data transmission of high speed, the MAC-hs sublayer manages a high speed downlink shared channel (HS-DSCH) which is a transport channel for downlink data transmission of high speed while the MAC-e sublayer manages an enhanced dedicated channel (E-DCH) which is a transport channel for uplink data transmission of high speed.

The RLC layer serves to assure quality of service (QoS) of each radio bearer (RB) and transmit data. The RLC layer includes one or two independent RLC entities for each RB to assure unique QoS of the RB, and provides three RLC modes, i.e., a transparent mode (TM), an unacknowledged mode (UM), and an acknowledged mode (AM) to support various kinds of QoS. Furthermore, the RLC layer serves to control data size to allow its lower layer to transmit data to a radio interval. To this end, the RLC layer serves to generate a protocol data unit (PDU) by segmenting and connecting service data unit (SDU) data received from its upper layer and to forward the generated protocol data unit to its lower layer.

The PDCP layer is located above the RLC layer, and allows data transmitted using IP packet such as IPv4 or IPv6 to be efficiently transmitted in a radio interval having a relatively small bandwidth. To this end, the PDCP layer performs a header compression function, which allows information necessarily required for a header of data to be transmitted, thereby increasing transmission efficiency of the radio interval. The PDCP layer exists only in a packet service (PS) domain due to its basic function, i.e., a header compression function, and has one PDCP entity per RB to provide effective header compression function for each packet service (PS).

In addition, the second layer includes a broadcast/multicast control (BMC) layer which exists above the RLC layer, wherein the BMC layer serves to perform scheduling of a cell broadcast message and broadcast for user equipments located in a specific cell.

A radio resource control (RRC) layer located at the lowest part of a third layer is defined only in a control plane, and is related to establishment, re-establishment, and release of RBs to control parameters of the first and second layers. Also, the RRC layer serves to control logical channels, transport channels and physical channels. At this time, the RB means a logical path provided by the first and second layers of the radio protocol for data transmission between the user equipment and the UTRAN. In general, establishment of the RB means that characteristics of channels and radio protocol layers required to provide a specific service are defined, and respective detailed parameters and operation method are established.

Figure 3:
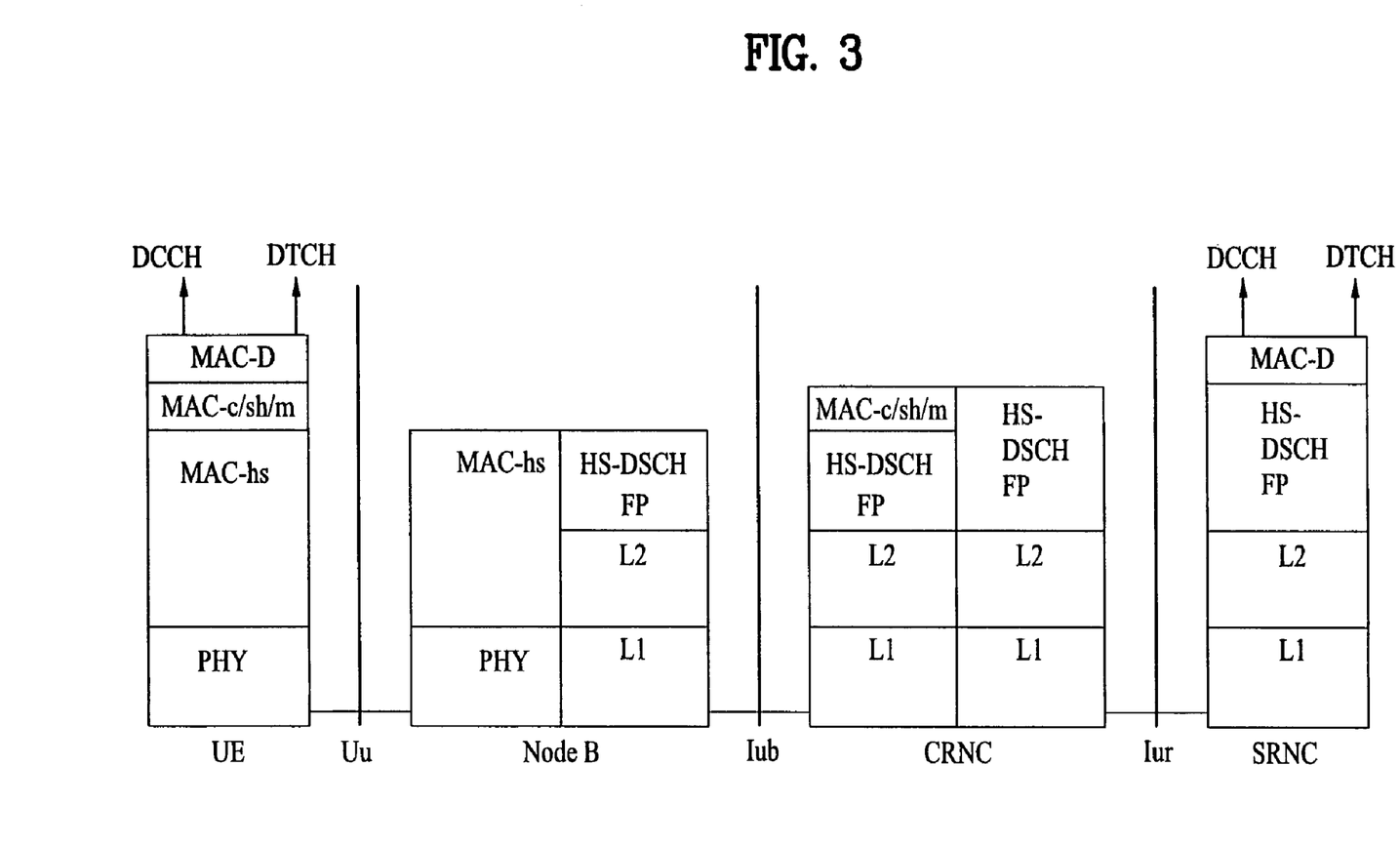
FIG. 3 illustrates a protocol architecture of a radio access interface in an HSDPA system.

FIG. 3 illustrates a protocol architecture of a radio access interface in an HSDPA system. Data transmission in the HSDPA system is performed through the HS-DSCH which is a downlink transport channel. The physical layer constitutes CCTrCH by using data forwarded through the HS-DSCH of the MAC-hs sublayer, wherein the CCTrCH consists of one HS-DSCH. On the HS-DSCH, a plurality of user equipments share radio resources by using a plurality of common channelization codes. Each of the user equipments can be allocated with a plurality of channelization codes within a single transmission time interval (TTI) depending on its capacity, and data for a plurality of user equipments can be transmitted by code multiplexing within the TTI of one HS-DSCH.

The HS-DSCH has a transmission time interval of 2 ms, and supports various modulation code sets (MCS) to assure a high data rate. It is possible to achieve optimized throughput by selecting the MCS most suitable for channel state. To this end, a hybrid automatic repeat request (HARQ) scheme obtained by combination of automatic repeat request (ARQ) scheme and a channel coding scheme is selected to enable reliable transmission.

In FIG. 3, a data unit delivered from the RLC layer of SRNC is forwarded to MAC-d through a logical channel, DTCH or DCCH, and forwarded to MAC-hs of Node B through MAC-c/sh/m of CRNC. In this case, the MAC-d the MAC-c/sh/m, and the MAC-hs are MAC entities, wherein the MAC-d entity manages a dedicated channel, the MAC-c/sh/m entity manages a common channel, and the MAC-hs entity manages HS-DSCH.

In the HSDPA system, the physical channel HS-PDSCH is used to transmit HS-DSCH which is the transport channel. The HS-PDSCH has a fixed spreading factor of 16, and corresponds to one channelization code selected from channelization code sets prepared for HS-DSCH data transmission. In case of multi-code transmission, a plurality of channelization codes are allocated during a single HS-PDSCH subframe.

Figure 4:
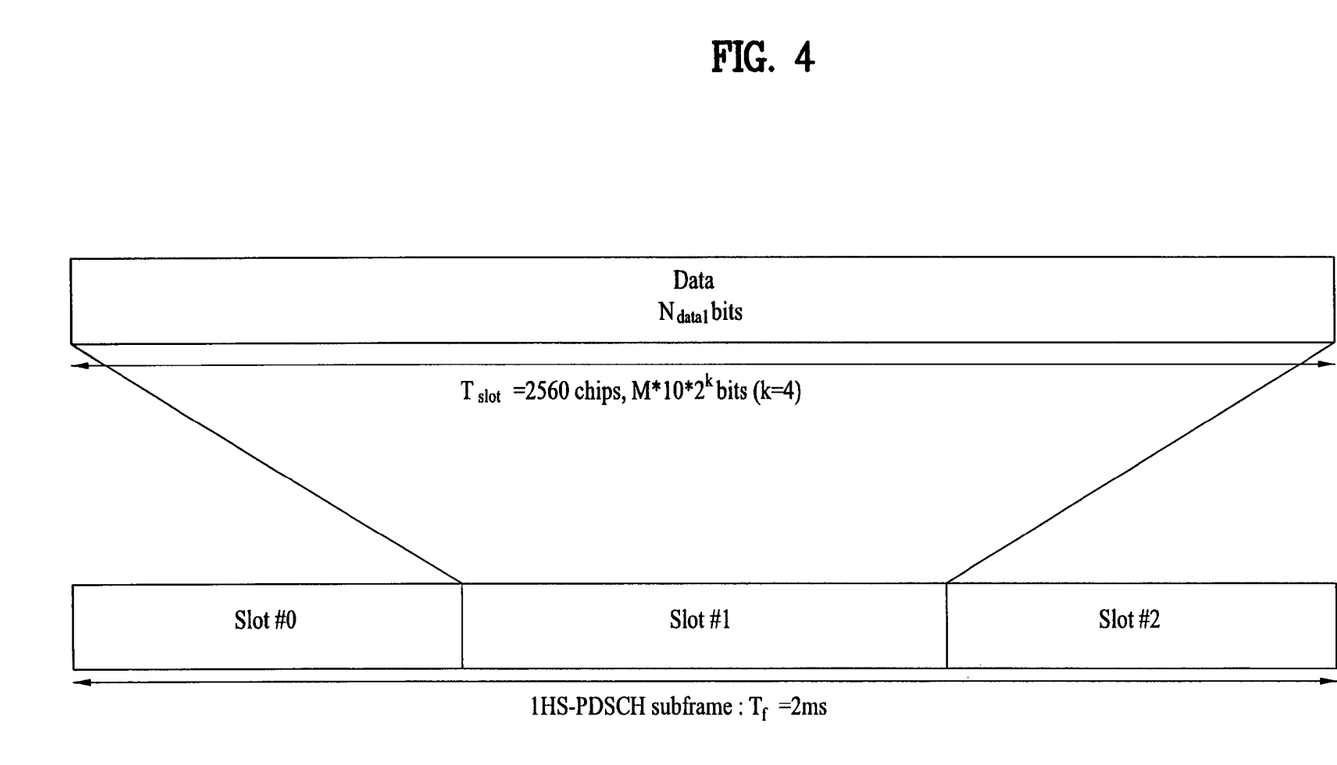
FIG. 4 illustrates a subframe and slot structure of HS-PDSCH.

FIG. 4 illustrates a subframe and slot structure of the HS-PDSCH. On the HS-PDSCH, QPSK or 16 QAM modulation symbols are transmitted. In FIG. 4, M means bits per modulation symbol. That is, M=2 is obtained in case of QPSK, and M=4 is obtained in case of 16 QAM.

Figure 5:
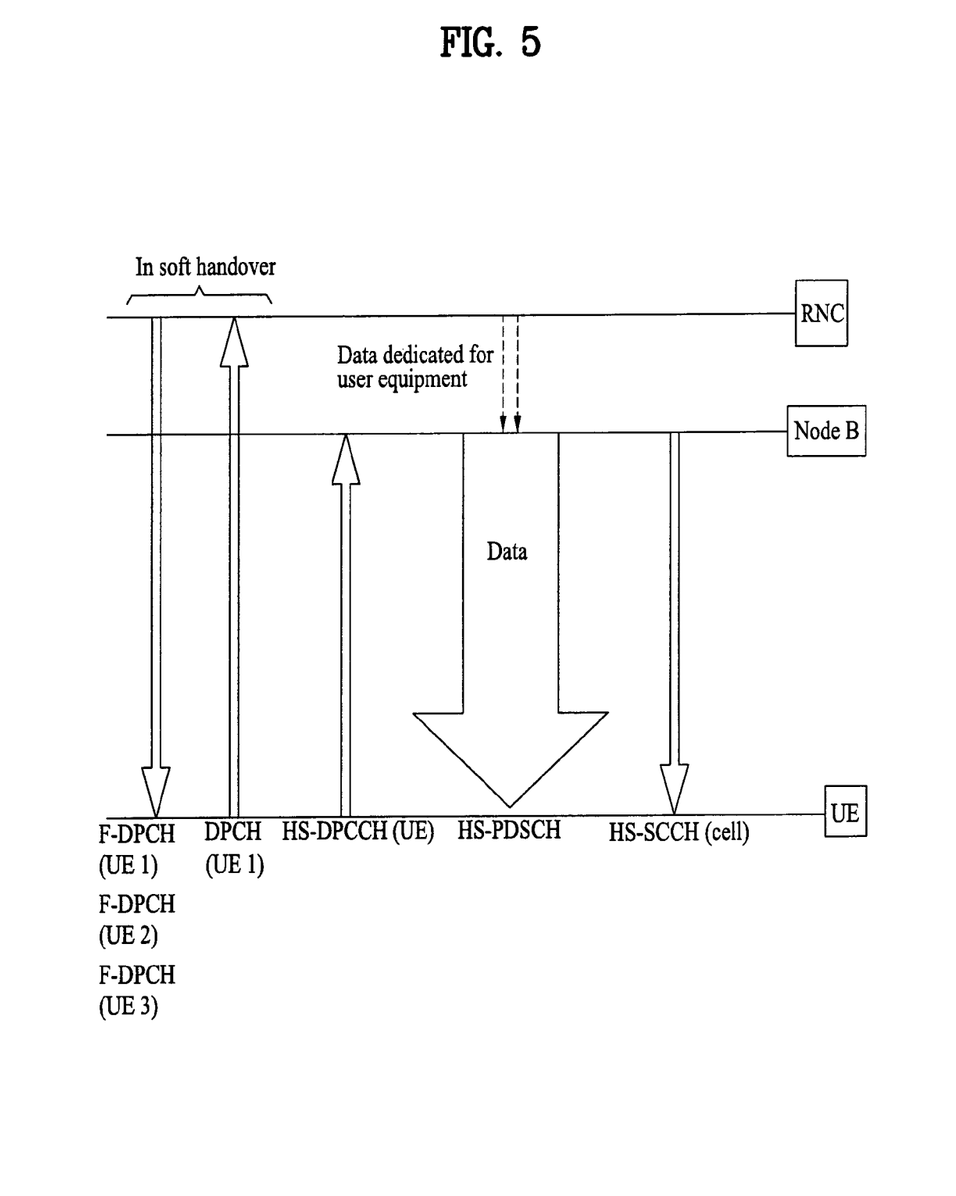
FIG. 5 illustrates a channel configuration of an HSPDA system.

FIG. 5 is a schematic diagram illustrating a channel configuration of the HSPDA system. As shown in FIG. 5, for data transmission through the HS-DSCH, transmission of HS-DSCH control information is needed, wherein the control information is transmitted through a high speed shared control channel (HS-SCCH) which is a downlink channel and a high speed dedicated physical control channel (HS-DPCCH) which is an uplink channel.

In FIG. 5, a dedicated physical channel (DPCH) is bidirectional physical channel, and is mapped with a transport channel DCH. The DPCH is used to forward dedicated data of a user equipment and layer 1 (L1) control information dedicated for a user equipment, such as a power control signal required for closed loop power control. Also, a fractional dedicated physical channel (F-DPCH) is a downlink channel, and is a physical channel which transmits several DPCHs by using one channelization code. In this case, one F-DPCH does not transmit dedicated data for a plurality of user equipments and is used to forward L1 control information dedicated for a plurality of user equipment, such as a power control signal required for closed loop power control. In case of F-DPCH which is a downlink channel, the DPCH which is an uplink channel is operated in conjunction with the F-DPCH. In FIG. 5, user equipments UE1, UE2 and UE3 commonly use the F-DCPH through one channelization code. In this case, each user equipment is provided with DPCH as an uplink.

Figure 6:
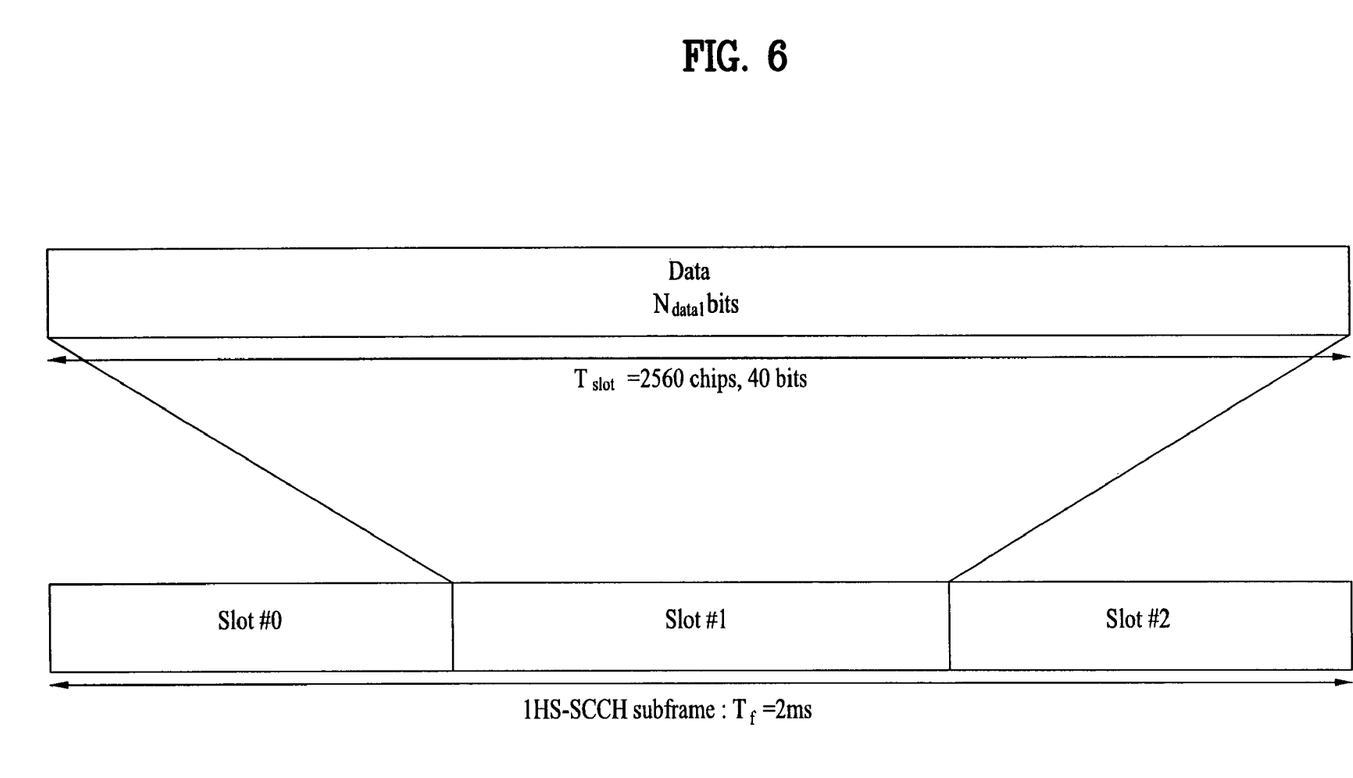
FIG. 6 illustrates a subframe configuration of an HSPDA system.

FIG. 6 is a diagram illustrating a subframe configuration of HS-SCCH. The HS-SCCH is transmitted with a spreading factor of 128, and a downlink physical channel having a transmission rate of 60 kbps. Information transmitted through HS-SCCH can be divided into transport format and resource related information (TFRI) and HARQ related information. In addition, user equipment identity information (H-RNTI) is transmitted by masking Details of HS-SCCH information are as follows.

1) TERI Information

Figure 7:
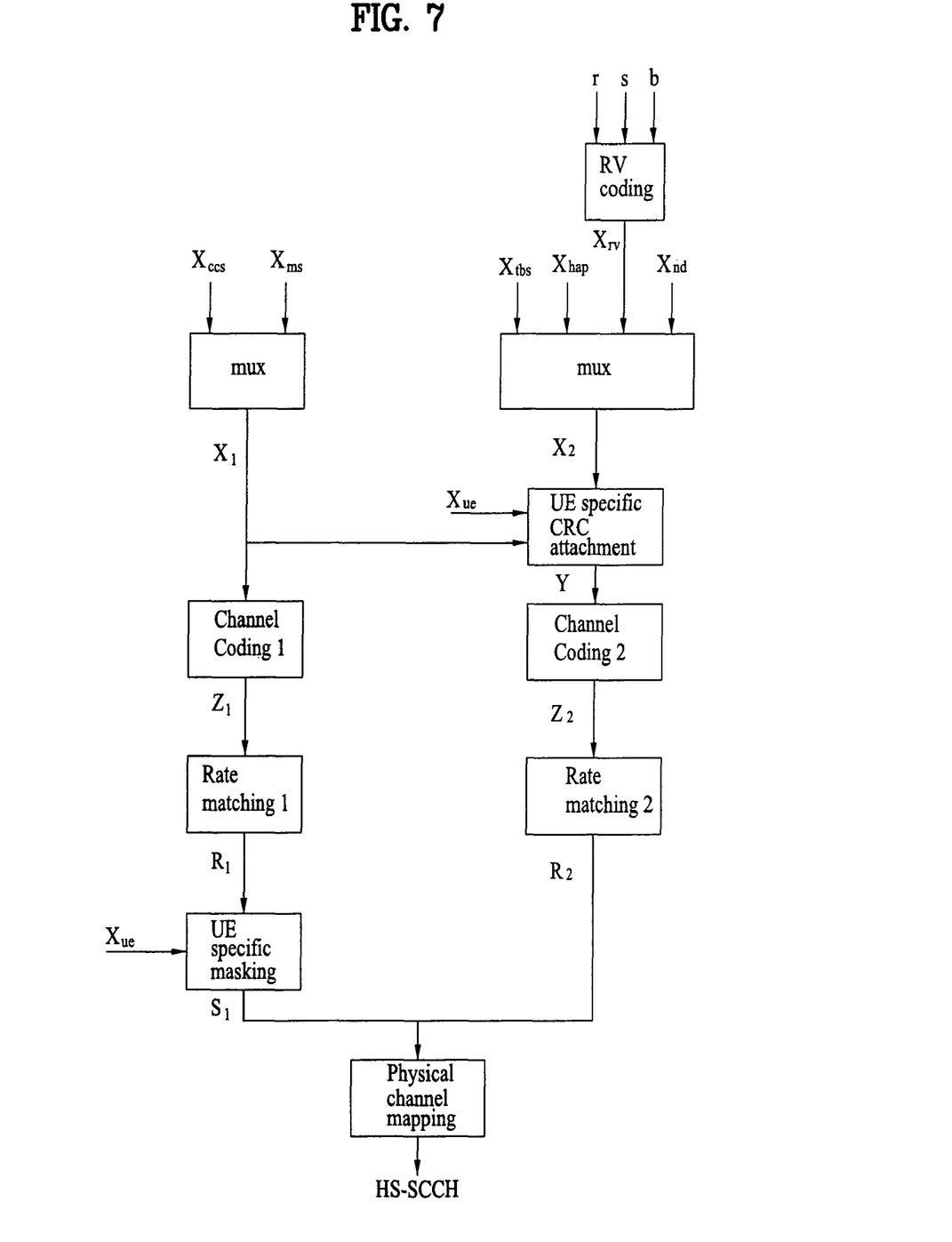
FIG. 7 illustrates a coding scheme of HS-SCCH according to HS-SCCH information.

Channelization-code-set information (7 bits): $X_{ccs,1}, X_{ccs,2}, \ldots, X_{ccs,7}$ Modulation scheme information (1 bit): $X_{ms,1}$ Transport-block size information (6 bits): $X_{tbs,1}, X_{tbs,2}, \ldots X_{tbs,6}$ 2) HARQ Information Hybrid-ARQ process information (3 bits): $X_{hap,1}, X_{hap,2}, X_{hap,3}$ Redundancy and constellation version (3 bits): $X_{rv,1}, X_{rv,2}, X_{rv,3}$ New data indicator (1 bit): $X_{nd,1}$ 3) UE ID Information UE identity (16 bits): $X_{ue,1}, X_{ue,2}, \ldots X_{ue,16}$ FIG. 7 is a diagram illustrating a coding scheme of HS-SCCH according to HS-SCCH information.

Figure 8:
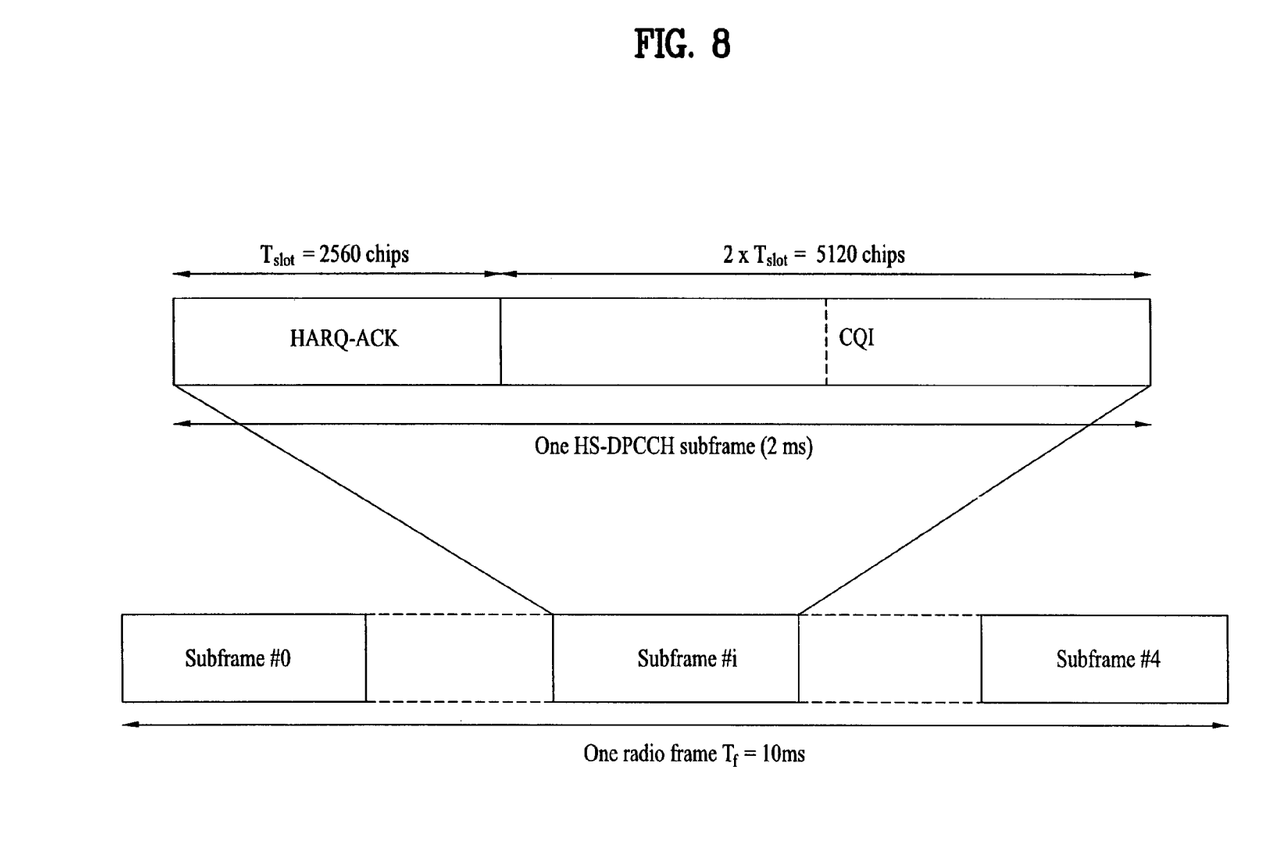
FIG. 8 illustrates a frame configuration of an uplink HS-DPCCH.

FIG. 8 is a diagram illustrating a frame configuration of an uplink HS-DPCCH. The HS-DPCCH which is an uplink channel transmits uplink feedback signaling related to data transmission of the HS-DSCH which is a downlink channel. The HS-DPCCH is a dedicated channel for a specific user equipment and is operated in conjunction with uplink and downlink dedicated physical channels (DPCH). Feedback signaling includes ACK/NACK information for HARQ and channel quality indicator (CQI). A frame of the HS-DPCCH has five subframes each of which is 2 ms, wherein one subframe includes three slots. ACK/NACK information for HARQ is transmitted to a first slot of the HS-DPCCH subframe, and CQI is transmitted to second and third slots of the HS-DSCH subframe. The HS-DPCCH is always transmitted along with an uplink PDCCH. CQI indicates that the user equipment (UE) forwards to the base station state information of a downlink radio channel obtained from the result of measurement of a common pilot channel (CPICH) which is a downlink channel, and ACK/NACK indicates ACK or NACK information for transmission of user data packet transmitted to a downlink HS-DSCH by HARQ scheme.

Figure 9:
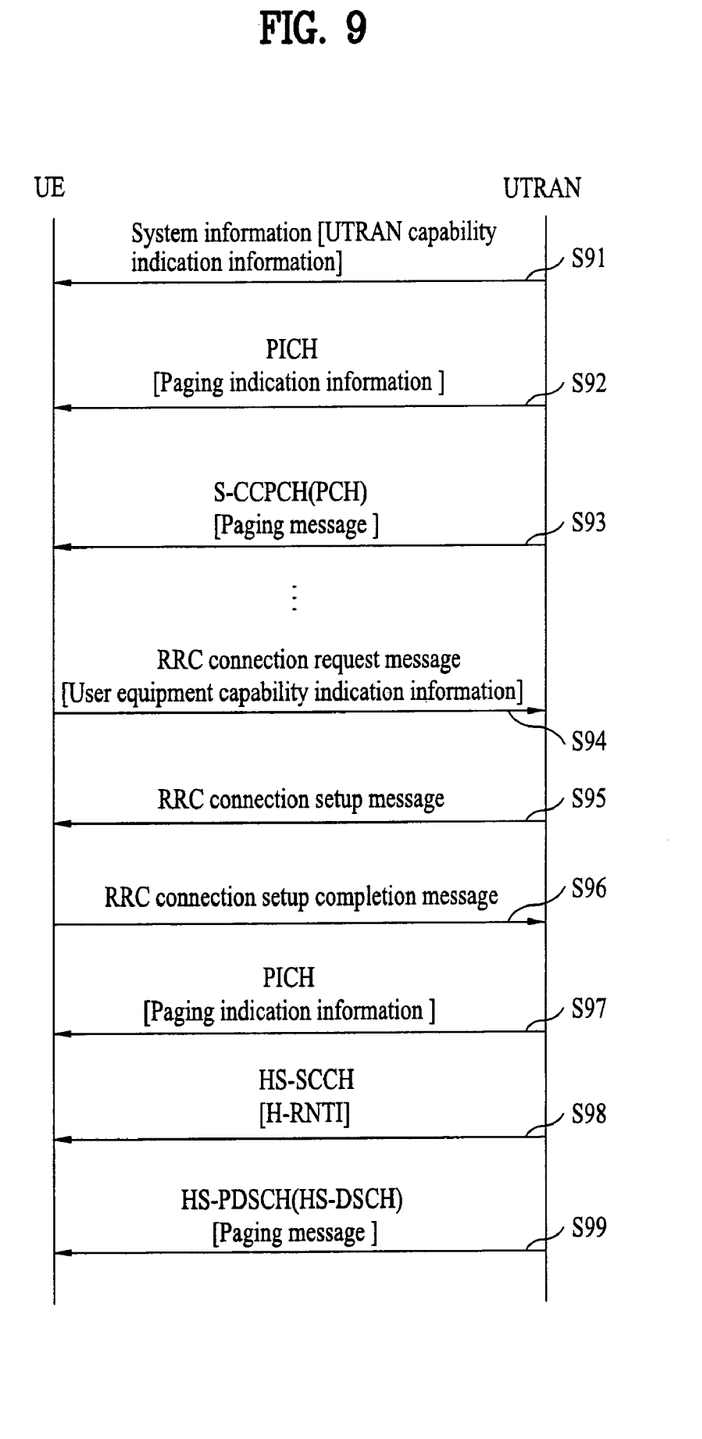
FIG. 9 is a flow chart illustrating a procedure according to one embodiment of the present invention.

FIG. 9 is a flow chart illustrating a procedure according to one embodiment of the present invention. In the embodiment of FIG. 9, the UTRAN in the UMTS system transmits paging messages to user equipments which are in an idle mode, through a secondary common control channel (S-CCPCH) mapped with a paging channel (PCH) which is a transport channel, and transmits paging messages to user equipments which are in a connected mode, through the HS-PDSCH mapped with the HS-DSCH which is a transport channel. When transmitting paging messages, the PCH and the HS-DSCH are mapped with a PCCH which is a logical channel.

Referring to FIG. 9, the user equipment receives system information broadcast from the UTRAN [S91]. If the user equipment is powered on, the user equipment selects a network to be accessed by the user equipment and then receives control information of a cell suitable to be provided with service. The control information means system information transmitted from the cell and cell broadcast messages, and the user equipment can acquire downlink scrambling code and frame synchronization information from the control information. The system information includes various kinds of information such as information for allowing a user equipment which is in an idle mode to access a network and information for supporting and measuring mobility of a user equipment which is in a connected mode.

In this embodiment, the system information further includes UTRAN capability indication information. The UTRAN capability indication information includes information on at least one channel through which the UTRAN transmits paging messages to user equipments. For example, the UTRAN capability indication information can include information indicating that the UTRAN can transmit paging messages through the HS-PDSCH. For another example, the UTRAN capability indication information can include information indicating that the UTRAN can transmit paging messages to the user equipment which is in an idle mode, through the S-CCPCH mapped with the PCH which is a transport channel, and trait paging messages to the user equipment is in a connected mode, through the HS-PDSCH.

In FIG. 9, since the user equipment is in an idle mode before establishing RRC connection, it receives paging messages through the S-CCPCH. In other words, if the UTRAN needs to call the user equipment, it transmits paging indication information to the user equipment through a paging indication channel (PICH) which is a physical channel [S92]. The paging indication information is an indicator which indicates paging for the user equipment only or an indicator which indicates paging for all user equipments which belong to a paging group.

The user equipment receives the paging messages transmitted from the UTRAN through the S-CCPCH after receiving the paging indication information [S93]. The user equipment which is in an idle mode discontinuously receives the PICH and the S-CCPCH mapped with the PCH by using a discontinuous reception (DRX) mode. The user equipment is in a sleeping mode for a time interval except that it receives the PICH or the S-CCPCH. The user equipment which performs the DRX mode wakes up once a specific period to monitor whether paging indication information is received through the PICH. The paging indication information is used to notify a specific user equipment that a paging message for the specific user equipment or a paging group will be transmitted from the UTRAN. The PICH is divided by a frame of 10 ms, wherein one PICH frame includes 300 bits. First 288 bits of 300 bits include paging indication information for one or more user equipments, and 12 bits of the latter part do not include any information. At this time, first 200 bits are defined as UE PICH, and 12 bits of the latter part are defined as a PICH unused part.

In order that the user equipment which is in an idle mode enters a connected mode with the UTRAN, the user equipment should perform RRC connection procedure. For RRC connection, the user equipment transmits RRC connection request message to the UTRAN [S94]. In general, the RRC connection request message includes initial user equipment identifier and information related to the reason why that RRC connection should be set. In this embodiment, the RRC connection request message further includes user equipment capability indication information. The user equipment capability indication information includes information indicating that the user equipment can receive paging messages through the HS-PDSCH, and can further include other capability information of the user equipment.

The UTRAN which has received the RRC connection request message from the user equipment transmits RRC connection setup message to the user equipment [S95]. The RRC connection setup message includes an initial identifier of the user equipment, a radio network temporary identifier, and radio bearer information. The user equipment transmits RRC connection setup completion message to the UTRAN after receiving the RRC connection setup message from the UTRAN [S96]. The RRC connection setup completion message includes radio network temporary identifier of the user equipment, user equipment capability information, etc. The user equipment capability information can include information indicating that the user equipment can receive paging messages through the HS-PDSCH. In other words, the information indicating that the user equipment can receive paging messages through the HS-PDSCH can be transmitted by being included in at least one of the RRC connection request message and the RRC connection setup completion message.

The UTRAN determines whether to transmit the paging messages for the user equipment through the S-CCPCH or the HS-PDSCH after setting up RRC connection, and can report the determined result to the user equipment. Also, if the information indicating that the user equipment can receive the paging messages through the HS-PDSCH is received from the user equipment, the UTRAN can transmit the paging messages for the user equipment through the HS-PDSCH without any separate procedure. If it is determined that the user equipment receives the paging messages through the HS-DSCH after setting up RRC connection, the UTRAN can set up RRC connection so that the user equipment can store cell radio network temporary identifier (C-RNTI) and H-RNTI therein. If RRC connection is not set up so that the user equipment can store C-RNTI and H-RNTI therein, the UTRAN can transmit the paging messages to the user equipment through the HS-DSCH by using HS-PDSCH code and transmission block size. Information related to the HS-PDSCH and the transmission block size is broadcast by being included in the system information.

If the user equipment establishes the RRC connection with the UTRAN, it enters RRC connected mode. The RRC connected mode can be divided into four states of CELL_DCH, CELL_FACH, CELL_PCH, and URA_PCH depending on types of physical channels which the user equipment can use. Each RRC state can be transited to another RRC state or another mode. The user equipment which is in the URA_PCH and CELL-PCH states of the four states wakes up from a sleeping mode to receive paging messages from the UTRAN within an interval of a certain period by using a DRX mode required to reduce power consumption like the user equipment which is in an idle mode.

In FIG. 9, the user equipment monitors whether the paging indication information transmitted to the user equipment within the interval of a certain period is received through the PICH [S97]. The UTRAN transmits H-RNTI of the user equipment through the HS-SCCH after transmitting paging indication information to the user equipment through the PICH. The H-RNTI may be transmitted by being masked to other information transmitted through the HS-SCCH as described with reference to FIG. 7. If the user equipment receives paging indication information through the PICH, it monitors, for subframes equivalent to the number of subframes which are previously set up, whether H-RNTI of the user equipment is received through the HS-SCCH [S98]. The H-RNTI could be H-RNTI dedicated for the user equipment or H-RNTI for calling all paging messages. Also, the H-RNTI could be the same for a specific user equipment group or a specific paging group. Information related to the number of subframes to be monitored as above can be broadcast by being included in the system information. If the user equipment receives H-RNTI through the HS-SCCH, it receives the paging messages transmitted from the UTRAN through the HS-PDSCH corresponding to the HS-SCCH [S99].

If the user equipment does not store H-RNTI therein, it receives the paging messages on the HS-PDSCH mapped with the HS-DSCH by using the HS-PDSCH code and the transmission block size which are used for transmission of paging messages. In other words, if the user equipment which does not store H-RNTI therein receives paging indication information through the PICH, it monitors, for subframes equivalent to the number of subframes which are previously set up, whether the paging messages are transmitted through the HS-DSCH, by using the HS-PDSCH code and the transmission block size. The HS-PDSCH code and the transmission block size are used to transmit the paging messages and are information broadcasted by being included in the system information.

Figure 10:
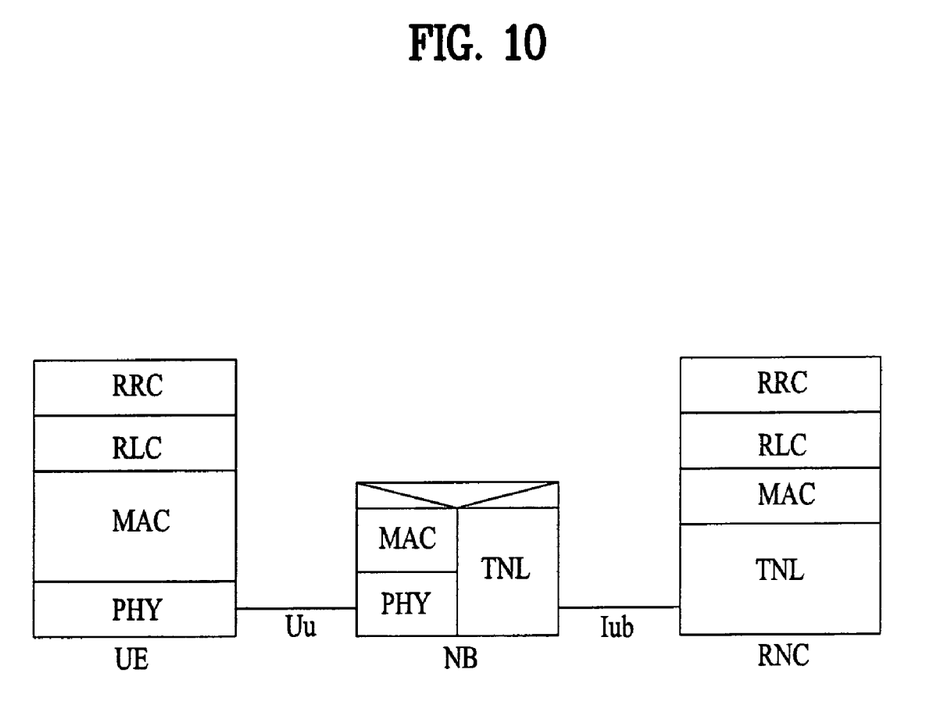
FIG. 10 illustrates a protocol configuration of a paging message transport channel according to one embodiment of the present invention.

FIG. 10 is a diagram illustrating a protocol configuration of a paging message transport channel according to one embodiment of the present invention. In FIG. 10, scheduling for transmission of paging messages is handled by Node B not RNC. If the RNC wishes to transmit paging messages to a specific user equipment through the HS-PDSCH, the RNC reports transport information of corresponding paging messages to Node B through Iub interface. The transport information includes DRX information of a corresponding user equipment, etc. MAC layer of Node B transmits the paging messages to the user equipment through the HS-PDSCH by using the transport information.

Although the aforementioned embodiments describe that technical features of the present invention are applied to one user equipment which is being transited from an idle mode to a connected mode, it will be apparent that the technical features of the present invention can be applied to different user equipments which are in different connected modes.

According to the present invention, it is advantageous in that transport channels of paging messages are varied depending on the connection state of the user equipment to efficiently use radio resources. The HS-DSCH described herein is based on the HS-DSCH used in the HSDPA system based on a CDMA mode. Accordingly, if the HS-DSCH is implemented in a wireless communication system which is based on orthogonal frequency division multiplexing (OFDM) or orthogonal frequency division multiple access (OFDMA) scheme, the features of the HS-DSCH described herein may not be applied to the communication system as they are. However, it will be apparent that the technical features of the present invention can be applied to the wireless communication system based on OFDM or OFDMA scheme.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the user equipment and the network. A specific operation which has been described herein as being performed by the network may be performed by the base station or an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station and mobile subscriber station.

The embodiments according to the present invention may be implemented by various means, for example, hardware, firmware, software, or their combination. If the embodiment according to the present invention is implemented by hardware, the method of transmitting and receiving paging messages in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving paging messages the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a wireless communication system such as a mobile communication system, a wireless Internet system, and the like.

The invention claimed is:

1. A method of receiving a paging message at user equipment in a wireless communication network, the method comprising:
transmitting capability indication information from the user equipment which is able to receive paging messages through a high speed downlink physical shared channel (HS-PDSCH), the capability indication information indicating that the user equipment is able to receive a paging message on the high speed downlink physical shared channel in a PCH state;

monitoring a high speed shared control channel (HS-SCCH) and identifying an HS-SCCH control message using an HS-DSCH radio network identifier (H-RNTI) that corresponds to the user equipment and receiving the paging message transmitted from the network on the HS-PDSCH using the control message.

2. The method of claim 1, wherein the PCH state is a state in which information can be transmitted and received between specific protocol layers of the network and the user equipment.

3. The method of claim 2, wherein the specific protocol layers are radio resource control (RRC) layers.

4. The method of claim 3, wherein the user equipment receives the paging message on a secondary common control channel (S-CCPCH) to which a paging channel is mapped if the user equipment is in an idle state.

5. The method of claim 1, further comprising:
receiving paging indication information from the network on a paging indication channel (PICH).

6. The method of claim 1, further comprising:
receiving the paging message on the HS-PDSCH using a HS-PDSCH code and a transport block size broadcast in system information, if the user equipment does not have stored therein an H-RNTI.

7. The method of claim 1, wherein transmitting capability indication information from the user equipment to the network comprises transmitting the capability indication information in a radio resource control (RRC) connection request message or in an RRC connection complete message.

8. User equipment for receiving a paging message in a wireless communication network, the user equipment comprising:
a transmitter adapted to transmit capability indication information from the user equipment to the network, the capability indication information indicating that the user equipment is able to receive a high speed downlink physical shared channel (HS-PDSCH) in a PCH state; and
a receiver adapted to monitor a high speed shared control channel (HS-SCCH) and receive an HS-SCCH control message that contains an HS-DSCH radio network identifier (H-RNTI) corresponding to the user equipment, the receiver further adapted to receive the paging message transmitted from the network on the HS-PDSCH using the control message, wherein the receiver is further adapted to receive the paging message on a secondary common control channel (S-CCPCH).

9. The user equipment of claim 8, wherein the PCH state is a state in which information can be transmitted and received between specific protocol layers of the network and the user equipment.

10. The user equipment of claim 9, wherein the specific protocol layers are radio resource control (RRC) layers.

11. The user equipment of claim 8, wherein the receiver is further adapted to receive the paging message on a secondary common control channel (S-CCPCH) to which a paging channel is mapped if the user equipment is in an idle state.

12. The user equipment of claim 8, wherein the receiver is further adapted to receive paging indication information from the network on a paging indication channel (PICH).

13. The user equipment of claim 8, wherein the receiver is further adapted to receive the paging message on the HS-PDSCH using a HS-PDSCH code and a transport block size broadcasted in system information, if no H-RNTI is stored in the user equipment.

14. The user equipment of claim 8, wherein the capability indication information is included in a radio resource control (RRC) connection request message or in an RRC connection complete message, wherein the RRC connection request message or the RRC connection complete message is to be transmitted from the user equipment to the network.

15. A method of receiving a paging message at user equipment in a wireless communication network, the method comprising:
transmitting capability indication information from the user equipment which receives paging messages on a secondary common control channel (S-CCPCH) when the user equipment is in an idle state and receives paging messages through a high speed downlink physical shared channel (HS-PDSCH) when the user equipment is in a PCH state, the capability indication information indicating that the user equipment is able to receive a paging message on the high speed downlink physical shared channel (HS-PDSCH) in the PCH state;
monitoring a high speed shared control channel (HS-SCCH) and identifying an HS-SCCH control message using an HS-DSCH radio network identifier (H-RNTI); and
receiving the paging message transmitted from the network on the HS-PDSCH using the control message.

16. The method of claim 15, wherein the PCH state is a state in which information can be transmitted and received between specific protocol layers of the network and the user equipment.

17. The method of claim 16, wherein the specific protocol layers are radio resource control (RRC) layers.

18. The method of claim 15, further comprising:
receiving paging indication information from the network on a paging indication channel (PICH).

19. The method of claim 15, further comprising:
receiving the paging message on the HS-PDSCH using a HS-PDSCH code and a transport block size broadcast in system information, if the user equipment does not have stored therein an H-RNTI.

20. The method of claim 15, wherein transmitting capability indication information from the user equipment to the network comprises transmitting the capability indication information in a radio resource control (RRC) connection request message or in an RRC connection complete message.

* * * * *